Figure 1:
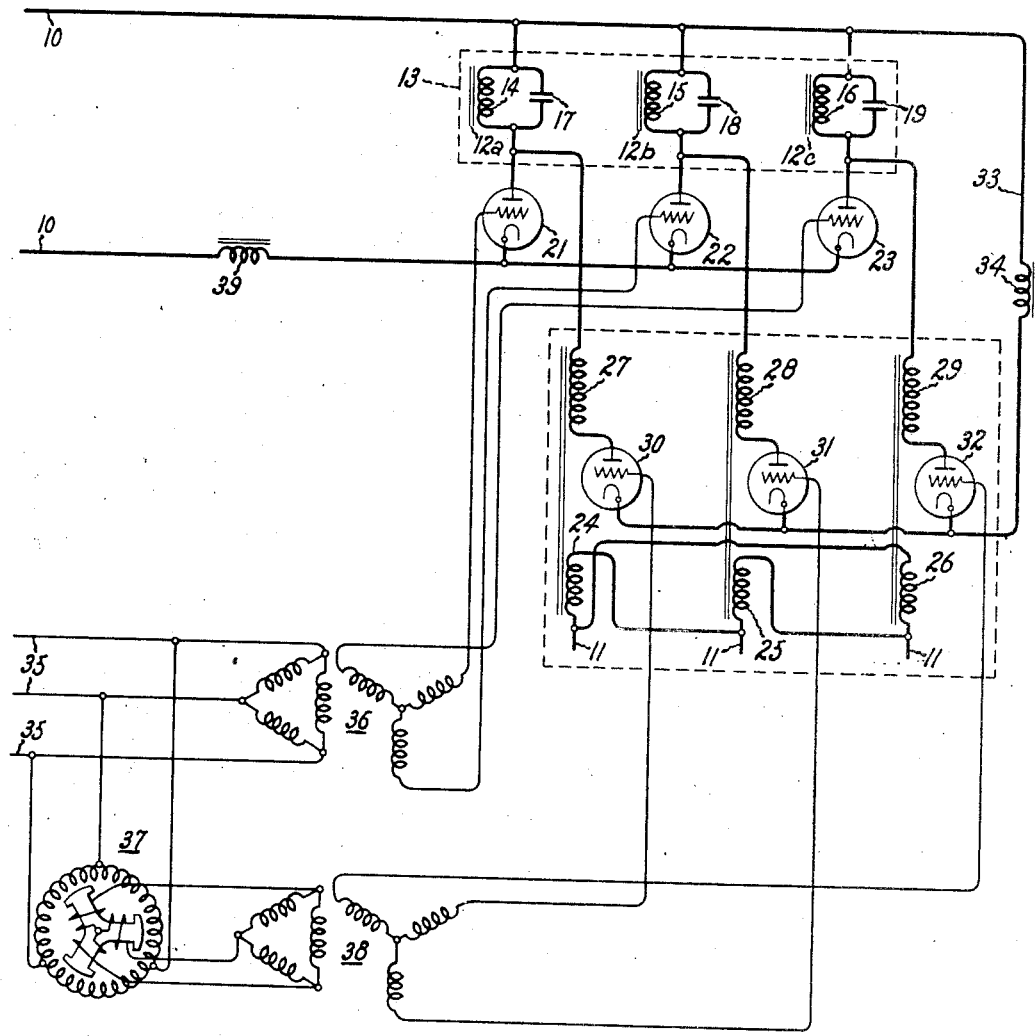

Patented Oct. 5, 1937

2,094,794

UNITED STATES PATENT OFFICE 2,094,794

CONSTANT CURRENT TO CONSTANT POTENTIAL INVERTER

Carl C. Herskind, Scotia, N. Y., assignor to General Electric Company, a corporation of New York Application October 17, 1936, Serial No. 106,207

10 Claims. (Cl. 175—363)

This invention relates to electric valve converting systems, and more particularly to such systems suitable for transferring energy between direct and alternating current circuits, one of which has a constant current characteristic.

An electric valve converting system suitable for transferring energy between constant potential and constant current circuits is disclosed in United States Letters Patent No. 1,961,080, granted May 29, 1934, upon the application of C. A. Sabbah. The apparatus disclosed therein utilizes a three-legged reactor having inductive windings on the several legs thereof and an energy storage device or capacitor associated with at least a portion of the inductive windings on each leg. The inductive windings on each leg are provided with intermediate terminals which are connected together through a polyphase alternating current network, the neutral of which forms one side of a direct current output circuit. If desired, alternating current power may be obtained from this arrangement by coupling suitable inductive windings to the polyphase alternating current network.

It is an object of my invention to provide an improved electric valve converting system for transferring energy between direct and alternating current circuits, one of which has a constant current characteristic, which will overcome certain limitations of the arrangements of the prior art, and which will be simple and reliable in operation.

It is a further object of my invention to provide an improved electric valve converting system of this type wherein a high utility is obtained for the energy storage and transfer device connected to the direct current circuit.

It is a still further object of my invention to provide an improved electric valve converting system wherein a minimum reactance is introduced into the direct current circuit.

It is still another object of my invention to provide an electric valve converting system of this type which will supply power to a lagging reactive load.

Still another object of my invention is to provide an improved electric valve converting system of this type wherein the direct current saturation is eliminated in the alternating current output transformer and wherein the size of the energy storage devices or capacitors may be reduced.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows an electric valve converting system embodying my invention which is suitable for transferring energy between direct and alternating current circuits, one of which has a constant current characteristic; and Fig. 2 discloses a modification of the system disclosed in Fig. 1 wherein the direct current saturation of the alternating current output transformer has been eliminated.

Referring now more particularly to Fig. 1 of the drawings, there is illustrated an arrangement embodying my invention for transferring energy between a direct current circuit 10 and an alternating current circuit 11, one of which has a constant current characteristic. This system is provided with an energy storage and transfer device comprising a polyphase magnetic core structure shown as a three-legged core structure by enclosing the three magnetic legs 12a, 12b and 12c within the dotted line 13. Each of the legs of the magnetic core structure 13 is provided with an inductive winding such as windings 14, 15 and 16, which are each provided with energy storage devices which may be in the form of capacitors 17, 18 and 19, respectively. These capacitors 17, 18 and 19 may be connected in parallel with the inductive windings 14, 15 and 16, respectively, or at least across portions thereof so as to form energy storage circuits. One terminal of the windings 14, 15 and 16 is connected to one side of the direct current circuit 10 and the other terminal of each of these windings is connected, respectively, by means of the electric valve paths 20, 21 and 22 to the other side of the direct current circuit 10.

The alternating current circuit 11 is connected to a three-phase alternating current transformer comprising the output windings 24, 25 and 26 and the input windings 27, 28 and 29. The flow of current through the windings 27, 28 and 29 is controlled by the electric discharge paths 30, 31 and 32 which electric discharge paths may be connected on either side of these windings. One terminal of each of the windings 27, 28 and 29 is connected to a point between the inductive windings 14, 15, 16, respectively, and the anodes of the electric discharge paths 21, 22 and 23, respectively. The other terminals of the windings 27, 28 and 29 are interconnected through the discharge paths 30, 31 and 32 so as to form a neutral connection which is connected by means of the conductor 33 having the direct current reactor 34 therein to the other side of the direct current circuit 10. While I have shown each of the electric discharge paths 21, 22, 23, 30, 31 and 32 as being individual electric discharge devices comprising an anode, a cathode and a control grid, these valves may be any of the several types well known in the art, although it is preferable to utilize valves of the type containing an ionizable medium and which are provided with a control or starting electrode whereby the discharge paths between the anodes and cathodes may be controlled. As will be apparent to those skilled in the art, the electric discharge paths 21, 22 and 23 may be combined into a single electric discharge apparatus of the type having a plurality of anodes, a single cathode and a plurality of control electrodes. Similarly, electric discharge paths 30, 31 and 32 when connected in the position shown in the drawings may be replaced by a single cathode, multi-anode electric discharge device of the control type. Furthermore, while I have shown electric valves of the type utilizing a grid as a control element, it will be apparent to those skilled in the art that any other device may be utilized which provides a means for controlling the instants of conductivity between the anode and cathode of the electric discharge path.

The control electrodes of the valves 21, 22 and 23 are energized from a suitable source of alternating potential 35 by means of a three-phase transformer 36, the secondary windings of which form part of the grid circuits of these valves. The control electrodes of the valves 30, 31 and 32 are energized from the same source of alternating current 35 through a phase shifting device 37 and the alternating current transformer 38, the secondary windings of which form part of the grid circuits of these valves. It will be apparent to those skilled in the art that each of the grid circuits of these valves may be provided with current limiting resistors as is common practice in the art. If the alternating potential of the circuit 35 is derived from a means provided with some means for readily varying the frequency of the alternating current, a further control of the transfer of energy between the direct and alternating current circuits may be obtained by varying the frequency of the alternating current circuit 35. In order to prevent any interaction between the electric valve converting system and the direct current circuit, the smoothing reactor 39 may be connected in one of the leads of the direct current circuit 10. It will also be apparent to those skilled in the art that instead of connecting the capacitors 17, 18 and 19 across the inductive windings 14, 15 and 16, other energy storage devices or circuits may be connected to the windings to serve the same purpose.

In operation the windings and capacitors associated with the core structure 13 serve to maintain the total magnetomotive force and that of each of the legs of the magnetic core structure at a substantially constant value. Each of the electric valves or electric valve paths 21 to 23 and 30 to 32 is conductive for 120 electrical degrees of each cycle of alternating current, these valves becoming conductive at a frequency equal to that of the alternating current source 35, from which the control electrodes or grids are controlled. In order to operate this system properly, the phase relation between the grid excitation of these valves 21, 22 and 23 and the valves 30, 31 and 32 must be such that the valves in the lower group become conductive in advance of the corresponding valves of the upper group. This angle of advance between the excitation of the two corresponding valves, as for example between valves 21 and 30, will lie between any value just greater than 0 degrees and slightly less than 180 degrees. The phase shifting device 37 provides the means for obtaining this phase difference and also operates as a control for determining the amount of energy transferred between the direct and alternating current circuits. The voltage relation and power transfer relation between the two circuits is also dependent upon the ratio between the windings of the alternating current transformer, the size of the windings 14, 15 and 16, the value of the capacitors connected across these windings, the frequency of the alternating current potential applied upon the control electrodes of the discharge devices as derived from the alternating current source 35, and the phase relation between the excitation of the groups of control electrodes of the valves 21, 22, 23 and 30, 31, 32.

The functions performed in the operation of the system by the three-legged core structure 13, the windings 14, 15, 16 and the associated capacitors 17, 18, 19 perhaps will be clarified by the following example of one cycle of operation of the electric valves 21 and 30 associated with one leg of the core structure. If we assume, for example, that the grid excitation supplied to the control electrodes of the valves 21 and 30 differs by a phase difference of 120 electrical degrees, the valve 30 will be conductive for 120 electrical degrees and meanwhile the valve 21 will remain nonconductive. Assuming that the capacitor 17 has been charged to a certain potential by previous operation, this now discharges into the winding 14, so that by the conductive connection through valve 30 energy is supplied to winding 27. At the end of the period of conductivity of the valve 30 the valve 21 becomes conductive and the valve 30 now remains nonconductive. Thus the current transmitted by the valve 21 serves to store energy in the capacitor 17 during the period of the conductivity of this valve. At the end of the period of the conductivity of the valve 21, the current is transferred from this valve to one of the other valves 22 or 23 and during the next 120 electrical degrees the valves 21 and 30 both remain nonconductive. During the period when both these valves are nonconductive the capacitor 17 discharges into the transformer windings 14 in order to maintain the required magnetomotive force in this transformer winding and in so doing it reverses the polarity of its potential so that it has the proper potential polarity to supply power to the anode of the valve 30 when this valve is again permitted to become conductive. From this it is believed that it will be apparent to those skilled in the art that the capacitors 17, 18 and 19 not only provide commutating potential to cause a transfer of current between the valve paths 21, 22 and 23 but also operate as energy storage devices to supply energy to the anodes of the valves 30, 31 and 32. For the purposes of explanation the operation of this system has been described as transferring energy from the direct current circuit 10 to the alternating current circuit 11 one of which has a constant current characteristic, but it will be apparent that the energy transfer may occur in the opposite direction. This system has the inherent characteristic that it is immaterial as to which one of the circuits has the constant current characteristic since it changes power from constant current energy to constant potential energy and vice versa. It will furthermore also be apparent to those skilled in the art that by providing means for varying the frequency of the alternating current source 35 the transfer of energy between the two circuits may be readily controlled.

Figure 2:
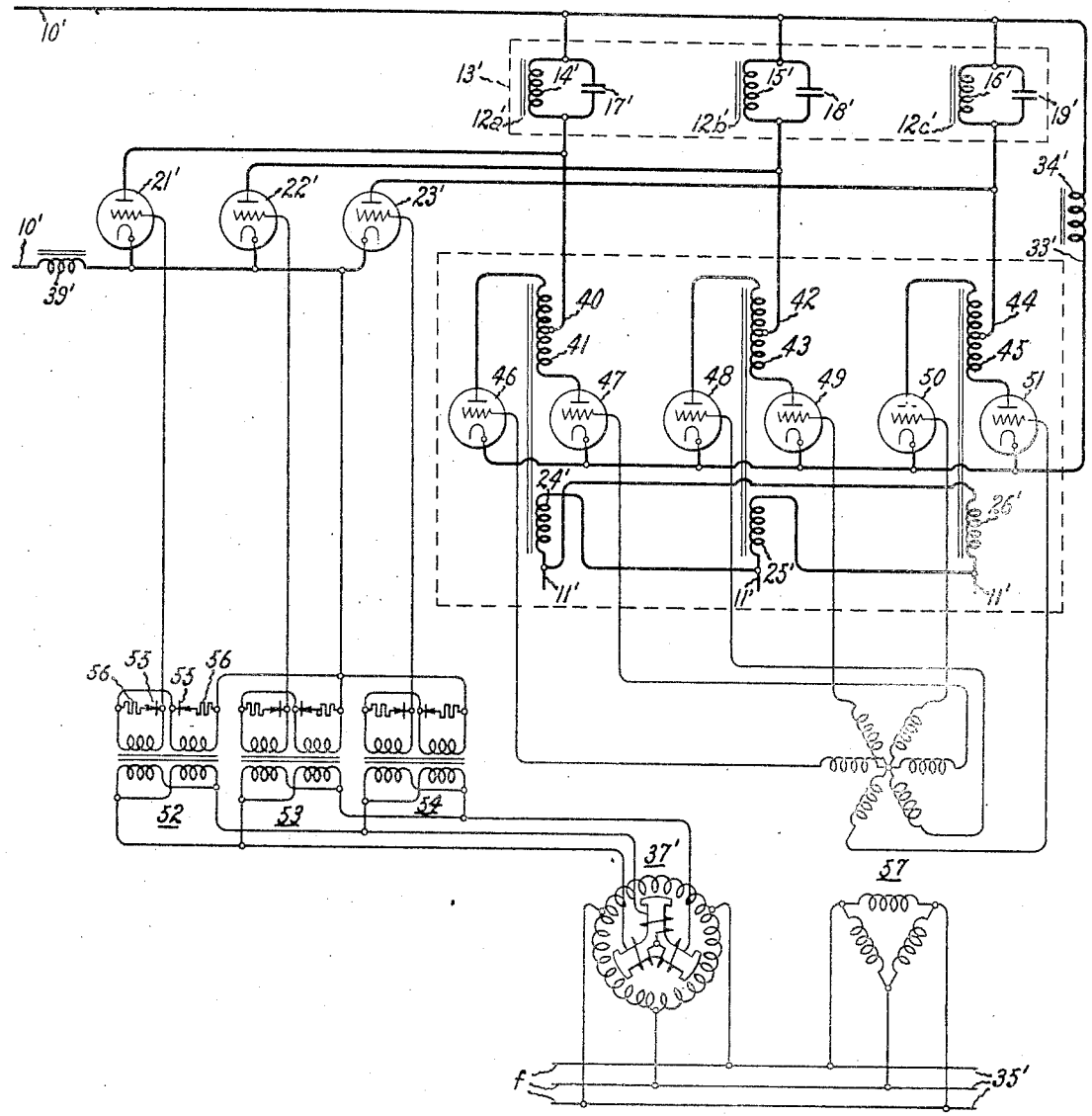

In Fig. 2 I disclose an electric valve converting system suitable for transferring energy between direct and alternating current circuits, one of which has a constant current characteristic. Since this system utilizes apparatus which corresponds to certain elements in Fig. 1, and the operation therein is similar, these elements have been given primed reference characters. In this arrangement, however, the alternating current circuit 11' is connected to the output winding 24' of the alternating current transformer which is provided with input windings each of which comprises a two-part winding such as 40, 41; 42, 43; and 44, 45. One of each of the extremities of the winding portions 40, 41; 42, 43; 44, 45 is connected by the means of electric discharge paths 46 to 50 through the conductor 33' and the reactor 34' to the other side of the direct current circuit 10'. The midpoints of the winding portions 40, 41; 42, 43; and 44, 45 are connected, respectively, to a point adjacent to the anodes of the electric discharge paths 21', 22' and 23' which are connected, respectively, to the windings 14', 15' and 16'.

The control electrodes of the electric valve discharge paths 21', 22' and 23' are energized from a suitable source of alternating potential 35' through the phase shifting device 37' and the grid circuit transformers 52, 53 and 54. The grid transformers 52, 53 and 54 are each provided with a pair of input and a pair of output windings which are so arranged as to provide positive potential impulses upon the control electrodes of the valves 21', 22' and 23' during each half cycle of the alternating current of the circuit 35'. This is accomplished by providing each of the secondary windings of the transformer 52, 53 and 54 with rectifying means 55 and a current limiting resistor 56 in series therewith which is so arranged as to suppress the negative half of the alternating current waves appearing across this transformer winding. From this it will be apparent to those skilled in the art that the electric valve paths 21', 22' and 23' are each rendered conductive twice during each cycle of the alternating current of the circuit 35'. The control electrodes of the valves 46 to 51 are energized from the same source of alternating current 35' through a six-phase transformer 57, the secondary windings of which are part of the grid circuits of these valves. It will be aparent to those skilled in the art that each of the grid circuits of these valves may also be provided with current limiting resistors as is common practice in the art. Furthermore, it will also be apparent that the electric valves 46 to 51 may be replaced by a single electric valve discharge of the multi-anode, single cathode type.

It is believed that the operation of Fig. 2 will be apparent to those skilled in the art since the operation is similar to that of Fig. 1 except that the frequency at which the apparatus comprising the inductive windings 14', 15', 16', 40 to 45 operates is twice that of the corresponding apparatus of Fig. 1. Due to this increase in the frequency of the operation of the windings 14', 15', 16' the size of the capacitors 17', 18' and 19' need only be approximately one-half of the size of the capacitors of the arrangement disclosed in Fig. 1. The arrangement disclosed in Fig. 2 also has the further advantage that due to the fact that the current flows successively in opposite directions through the two halves of the inductive windings 40, 41; 42, 43; and 44, 45 the possibility of direct current saturation of the alternating current output transformer is eliminated.

While I have shown and described my invention in connection with certain specific embodiments it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. An electric valve converting system for transferring energy between direct and alternating current circuits, one of which has a constant current characteristic comprising an energy storage and transfer device interconnected with said direct current circuit, a transformer having one set of its windings connected to said alternating current circuit, means including electric discharge valve means for interconnecting said device and the other windings of said transformer with said direct current circuit, and means for controlling the conductivities of said valve means.

2. An electric valve converting system for transferring energy between direct and alternating current circuits one of which has a constant current characteristic including an energy storage and transfer device, electric valve means connecting said device across said direct current circuit, a transformer having primary and secondary sets of windings, one set of said windings being connected to said alternating current circuit, and means including electric valve means interconnecting the remaining set of transformer windings with said device and said direct current circuit, and means for controlling the conductivities of said electric valve means.

3. An electric valve converting system for transferring energy between direct and alternating current circuits, one of which has a constant current characteristic, including a multi-legged core structure provided with a winding on each leg thereof, an energy storage device for each of said windings, means including an electric valve means for each winding connecting said windings across said direct current circuit, a transformer provided with primary and secondary windings, one of said transformer windings being connected to said alternating current circuit, means including electric valve means interconnecting said other transformer windings with said direct current circuit and the windings of said multi-legged core structure, and means for controlling the conductivities of said valve means.

4. An electric valve converting system for transferring energy between direct and alternating current circuits, one of which has a constant current characteristic, including a multi-legged core structure provided with a winding on each leg thereof, an energy storage device for each of said windings arranged parallel thereto, means including electric discharge valve means for each winding connecting said windings across said direct current circuit, a transformer provided with primary and secondary windings, one of said transformer windings being connected to said alternating current circuit, electric valve means connected to the other of said windings for controlling the flow of current therethrough, means connecting said latter valves and windings in parallel with the respective windings of said multi-legged core structure, and means for controlling the conductivities of said valve means.

5. An electric valve converting system for transferring energy between constant potential and constant current circuits comprising an $n$-legged core structure having a winding on each leg thereof, an energy storage device for each leg associated with the winding thereon, means including $n$ electric discharge valve means for interconnecting said windings with one of said circuits, a transformer having $n$ primary and $n$ secondary windings, one of said windings being connected to the other of said circuits, means including $n$ electric discharge valve means interconnecting the remaining transformer windings with said first circuit and the windings of said $n$-legged core structure, and means for controlling the conductivities of said valve means.

6. An electric valve converting system for transferring energy between direct and alternating current circuits one of which has a constant current characteristic including an energy storage and transfer device, electric valve means connecting said device across said direct current circuit, a transformer having primary and secondary sets of windings, one set of said windings being connected to said alternating current circuit, means including electric valve means interconnecting the remaining set of transformer windings with said device and said direct current circuit, means for controlling the conductivities of said electric valve means, and means for shifting the instant of conductivity of one of said electric valve means relative to the other of said electric valve means to control the transfer of energy between said circuits.

7. An electric valve converting system for transferring energy between direct and alternating current circuits, one of which has a constant current characteristic, including a multi-legged core structure provided with a winding on each leg thereof, a capacitor for each of said windings, each capacitor being connected to a winding to maintain a substantially constant magnetomotive force in said structure, means including an electric discharge path for each winding for controlling the flow of energy therethrough, said electric discharge paths and windings being connected across said direct current circuit, a transformer provided with a plurality of primary and secondary windings, one of said windings being provided with intermediate connections, means including a plurality of electric discharge paths for interconnecting the extremities of said latter windings with said direct current circuits, means interconnecting said intermediate connections of said transformer windings with the windings of said multi-legged core structure, means connecting the remaining transformer windings with said alternating current circuit, means for controlling the conductivities of said latter electric discharge paths, and means for controlling the conductivities of said first mentioned electric discharge paths at a frequency which is a multiple of the frequency at which said other electric discharge paths are rendered conductive.

8. An electric valve converting system for transferring energy between direct and alternating current circuits, one of which has a constant current characteristic, including a multi-legged core structure provided with a winding on each leg thereof, an energy storage device for each of said windings, means including an electric valve means for each winding connecting said windings across said direct current circuit, a transformer provided with primary and secondary windings, one of said transformer windings being connected to said alternating current circuit, means including electric valve means interconnecting said other transformer windings with said direct current circuit and the windings of said multi-legged core structure, means for controlling the conductivities of said valve means, said latter means rendering conductive said first mentioned electric means at a frequency equal to twice the frequency of said alternating current circuit.

9. An electric valve converting system for transferring energy between constant potential and constant current circuits comprising an energy storage and transfer device including an $n$-legged core structure, means including $n$ electric discharge valve means for interconnecting said energy storage and transfer device with said direct current circuit, a transformer having $n$ primary and $n$ secondary windings, one set of said windings being provided with midtaps, means including two $n$ electric discharge valve means interconnecting said midtap transformer windings with said direct current circuit and said energy storage and transfer device, means connecting said other transformer winding with one of said circuits, and means for rendering conductive said valve means, said latter means rendering conductive said first electric discharge valve means at a frequency equal to twice the frequency of said alternating current transformer.

10. An electric valve converting system for transferring energy between direct and alternating current circuits one of which has a constant current characteristic, including an energy storage and transfer device, electric valve means connecting said device across said direct current circuit, a transformer having primary and secondary sets of windings, one set of said windings being connected to said alternating current circuit, means including electric valve means interconnecting the remaining said valve transformer windings with said energy storage and transfer device and said direct current circuit, means for controlling the conductivities of said electric valve means, said means rendering conductive said first electric valve means at a frequency equal to twice the frequency of said alternating current circuit, and means for shifting the instants of conductivity of one of said electric valve means relative to the other of said electric valve means to control the transfer of energy between said circuits.

CARL C. HERSKIND.